(12) United States Patent
Guan et al.

(10) Patent No.: US 8,443,419 B2
(45) Date of Patent: May 14, 2013

(54) METHOD, DEVICE, AND SYSTEM FOR PRE-AUTHENTICATION

(75) Inventors: Hongguang Guan, Nanjing (CN); Xiaoyu Gong, Shenzhen (CN); Yungui Wang, Nanjing (CN); Hongguang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/234,470

(22) Filed: Sep. 16, 2011

(65) Prior Publication Data

US 2012/0011576 A1    Jan. 12, 2012

Related U.S. Application Data

(63) Continuation of application No. PCT/CN2010/071115, filed on Mar. 18, 2010.

(30) Foreign Application Priority Data

Mar. 18, 2009    (CN) .......................... 2009 1 0106152

(51) Int. Cl.
*H04L 9/32* (2006.01)
*H04L 9/00* (2006.01)

(52) U.S. Cl.
USPC ......... 726/2; 726/3; 726/4; 713/155; 713/168

(58) Field of Classification Search ................. 726/2–7; 713/168–171, 155; 380/270
See application file for complete search history.

(56) References Cited

U.S. PATENT DOCUMENTS 7,336,960 B2 * 2/2008 Zavalkovsky et al. ........ 455/453
7,624,267 B2 * 11/2009 Huang et al. .................. 713/168
2005/0163078 A1 7/2005 Oba et al.
2007/0213033 A1 9/2007 Alper et al.
2008/0207206 A1 8/2008 Taniuchi et al.
2008/0310366 A1 12/2008 Oba et al.
2009/0067623 A1 3/2009 Lei et al.

FOREIGN PATENT DOCUMENTS

| CN | 1969568 A | 5/2007 |
|---|---|---|
| CN | 101193427 A | 6/2008 |
| CN | 101212798 A * | 7/2008 |
| WO | WO 2008/109039 A1 | 9/2008 |
| WO | WO 2008/153164 A2 | 12/2008 |

OTHER PUBLICATIONS

Written Opinion of the International Searching Authority dated Jun. 24, 2010 in connection with International Patent Application No. PCT/CN2010/071115.

(Continued)

*Primary Examiner* — Hosuk Song

(57) ABSTRACT

The present invention relates to mobile communications technologies, and discloses a method, device, and system for pre-authentication. A pre-authentication device receives a pre-authentication message that carries a pre-authentication option; determines a Mobile Node (MN) to be pre-authenticated according to the pre-authentication message; sends an authentication request message to an Authentication, Authorization and Accounting (AAA) server to request authentication of the MN; receives an authentication response message that is sent by the AAA server, where the authentication response message carries a pre-authentication key used between a Candidate Authenticator (CA) and the MN; and sends the pre-authentication key to the MN. Through implementation of the present invention, the pre-authentication key is obtained before the MN switches to the CA. In this way, security of communication is enhanced, and delay of switching and authentication is shortened.

8 Claims, 9 Drawing Sheets

OTHER PUBLICATIONS

Supplemetary European Search Report dated Dec. 1, 2011 in connection with European Patent Application No. EP 10 75 3136.
Subir Das, et al., "Technical Requirements document for MIH Security", IEEE 802.21 MIHO, Sep. 27, 2007, 11 pages.
International Search Report dated Jun. 24, 2010 in connection with International Patent Application No. PCT/CN2010/071115.
Translation of Office Action dated Dec. 5, 2012 in connection with Chinese Patent Application No. 200910106152.9.

* cited by examiner

US 8,443,419 B2

METHOD, DEVICE, AND SYSTEM FOR PRE-AUTHENTICATION

CROSS-REFERENCE TO RELATED APPLICATIONS

This application is a continuation of International Application No. PCT/CN2010/071115, filed on Mar. 18, 2010, which claims priority to Chinese Patent Application No. 200910106152.9, filed on Mar. 18, 2009, both of which are hereby incorporated by reference in their entireties.

TECHNICAL FIELD

The present invention relates to mobile communication technologies, and in particular, to a method, device, and system for pre-authentication in a multi-authenticator scenario.

BACKGROUND

Extensible Authentication Protocol (EAP) architecture generally includes a client, an authenticator, and an Authentication, Authorization and Accounting (AAA) server/EAP server. The authenticator is generally located at the edge of a network, and is coupled with the AAA server/EAP server, or is stand-alone. This architecture provides a function of authenticating and authorizing client devices. An EAP method in EAP is designed to generate a key material such as a Master Session Key (MSK) and an Extended Master Session Key (EMSK). The MSK is applied to a lower-layer protocol below the EAP, and the EMSK is used to protect interaction between a client and the AAA server. Because a complete EAP process generally involves more than two round trips of interaction, delay of authentication and authorization is generally long. A mechanism of reusing a key and state information generated in initial authentication and avoiding use of an asymmetrical key is taken to reduce such switching delay in many measures. However, the extent of improvement of the number of the times of interaction varies depending on the EAP method in use. Regardless of the extent of improvement, an authentication and authorization process is completed only after at least two round trips of interaction are complete. The switching delay is not acceptable to certain real-time applications.

To support quick switching, complete AAA-based authentication is generally avoided. A complete authentication process involves multiple round trips of interaction with a home AAA server of a Mobile Node (MN), which leads to long switching delay. Common EAP authentication methods used in quick switching include EAP re-authentication and EAP pre-authentication. A conception of the EAP re-authentication is: a local EAP server mechanism is introduced, and the key material used in initial complete authentication is reused to avoid too many EAP-based AAA messages in a switching process of the mobile terminal. A conception of the EAP pre-authentication is: an MSK is generated before switching of the mobile terminal, and is used for authentication between the mobile terminal and a Candidate Authenticator (CA).

In the process of developing the present invention, the inventor finds that the prior art has the following problems:

In the process of interaction between an EAP client and an AAA server, it is generally necessary to traverse two authenticators, namely, a Serving Authenticator (SA) and a CA. In this case, the SA and the CA are unable to judge whether an authentication request sent by the client is an ordinary authentication request or a pre-authentication request, and unable to judge whether the SA and the CA themselves need to interact with the AAA server to complete a pre-authentication process, which leads to a pre-authentication failure and switching delay.

SUMMARY

Embodiments of the present invention provide a method, device, and system for pre-authentication. Through implementation of the present invention, an SA and a CA can correctly identify a pre-authentication message, and use a pre-authentication key obtained in a pre-authentication process to protect communication between an MN and the CA. In this way, security of communication is enhanced, and delay of switching and authentication is shortened.

A pre-authentication method provided in an embodiment of the present invention includes: receiving a pre-authentication message that carries a pre-authentication option; determining an MN to be pre-authenticated according to the pre-authentication message; sending an authentication request message to an AAA server to request authentication of the MN, where the authentication request message carries the pre-authentication option; receiving an authentication response message that is sent by the AAA server, where the authentication response message carries a pre-authentication key used between a CA and the MN; and sending the pre-authentication key to the MN.

A pre-authentication device provided in an embodiment of the present invention includes: a first receiving unit, configured to receive a pre-authentication message that carries a pre-authentication option; a determining unit, configured to determine an MN to be pre-authenticated according to the pre-authentication message; a first sending unit, configured to send an authentication request message to an AAA server to request authentication of the MN, where the authentication request message carries the pre-authentication option; a second receiving unit, configured to receive an authentication response message that is sent by the AAA server, where the authentication response message carries a pre-authentication key used between a CA and the MN; and a second sending unit, configured to send the pre-authentication key to the MN.

A pre-authentication system provided in an embodiment of the present invention includes a pre-authentication device and an AAA server. The pre-authentication device is configured to: receive a pre-authentication message that carries a pre-authentication option; determine an MN to be pre-authenticated according to the pre-authentication message; send an authentication request message to an AAA server to request authentication of the MN, where the authentication request message carries the pre-authentication option; receive an authentication response message that is sent by the AAA server, where the authentication response message carries a pre-authentication key used between a CA and the MN; and send the pre-authentication key to the MN. The AAA server is configured to: receive the authentication request message that is sent by the pre-authentication device; generate the pre-authentication key used between the CA and the MN according to the authentication request message; add the pre-authentication key to the authentication response message; and send the authentication response message to the pre-authentication device.

Through implementation of the present invention, the SA or the CA can correctly identify a pre-authentication message; after receiving the pre-authentication message, the SA or the CA obtains the pre-authentication key, used between the CA and the MN, from the AAA server; when the MN switches to the CA, the pre-authentication key may be used to protect the communication between the MN and the CA. In this way, security of communication is enhanced, and delay of switching and authentication is shortened.

BRIEF DESCRIPTION OF THE DRAWINGS

To make technical solutions of the present invention clearer, the accompanying drawings for illustrating embodiments of the present invention are outlined below. Evidently, the accompanying drawings are only exemplary, and those skilled in the art can derive other drawings without any creative effort.

DETAILED DESCRIPTION

The embodiments of the present invention are detailed below with reference to the accompanying drawings.

Figure 1:
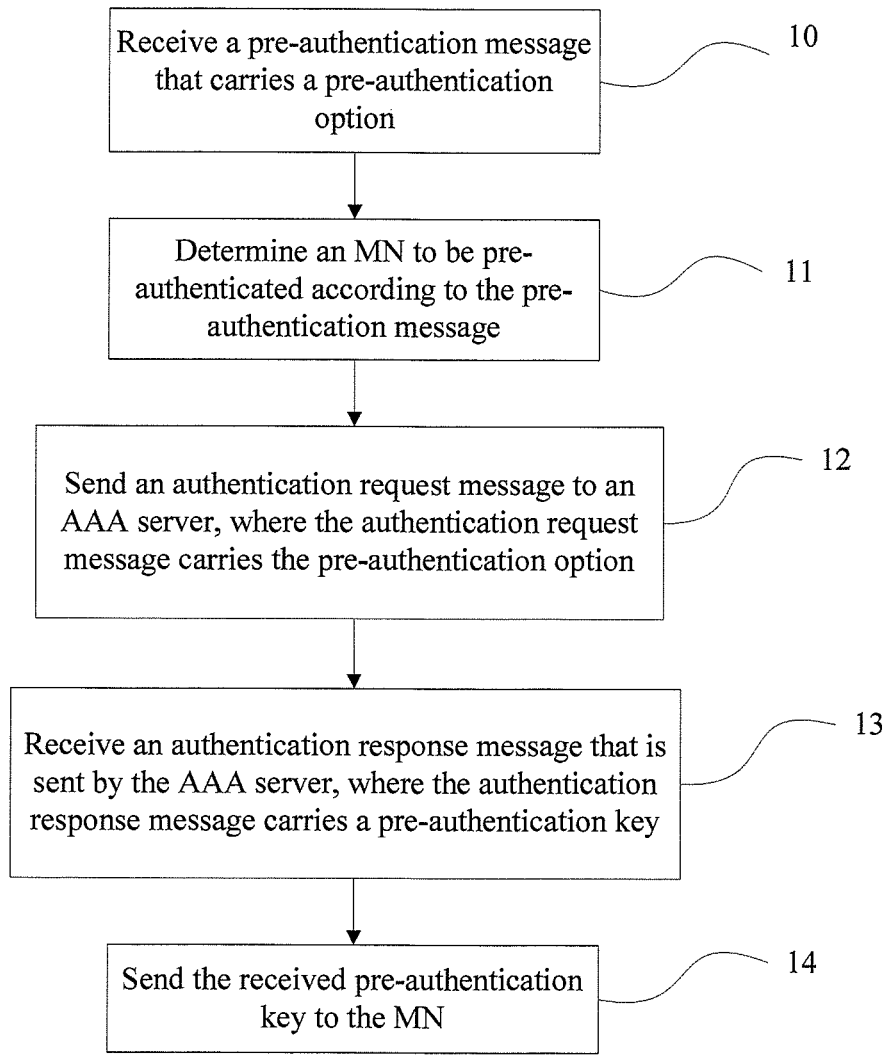
FIG. 1 is a schematic flowchart of a pre-authentication method according to an embodiment of the present invention.

FIG. 1 is a schematic flowchart of a pre-authentication method according to an embodiment of the present invention. The method includes the following steps:

10. Receive a pre-authentication message that carries a pre-authentication option.

The pre-authentication message may be sent by an MN that serves as a client, or by an SA of the MN. The pre-authentication option may be a pre-authentication start (Pre-auth Start) flag or a CA identifier (CA_ID) which indicates a purpose of the pre-authentication message.

11. Determine an MN to be pre-authenticated according to the pre-authentication message.

If the pre-authentication message is sent by the MN, the source node of the pre-authentication message is the MN to be pre-authenticated; if the pre-authentication message is sent by the SA, the MN to be pre-authenticated is determined according to content of the pre-authentication message.

12. Send an authentication request message to the AAA server, where the authentication request message carries the pre-authentication option. The authentication request message requests the AAA server to authenticate the MN that serves as the client, and generate a pre-authentication key used between a CA and the MN. The authentication request message needs to carry a pre-authentication option. The pre-authentication option is the same as the pre-authentication option described in step 10, and specifically, may be a CA_ID. The CA_ID may be carried in a pre-authentication option, or an independent option.

13. Receive an authentication response message that is sent by the AAA server, where the authentication response message carries the pre-authentication key used between the CA and the MN. After successfully authenticating the MN, the AAA server generates the pre-authentication key used between the CA and the MN according to the pre-authentication option and other key materials. In addition, the AAA server sends the authentication response message that carries the pre-authentication key to the CA.

14. Send the received pre-authentication key to the MN that serves as a client.

The pre-authentication key is sent by the SA to the MN. After receiving the pre-authentication key, the MN determines that the pre-authentication with the CA is complete.

If the step of receiving the pre-authentication message is performed by the CA, a step of establishing a pre-authentication binding relationship may occur between step 11 and step 12. Specifically, the CA establishes a pre-authentication binding relationship between the CA and the MN, and marks an authentication state of the MN as pre-authenticated according to the pre-authentication message.

In this embodiment, the pre-authentication key includes the pre-authentication key used between the CA and the MN, and an MSK and an EMSK used between the MN and the AAA server.

Through implementation of this embodiment, after receiving an authentication message, the CA determines that the message is a pre-authentication message according to the pre-authentication option carried in the message, and initiates a pre-authentication process. In this case, a process of authenticating the MN is complete before the MN is attached to the CA. When the MN switches to the CA, the pre-authentication key may be used to quickly authenticate the MN, which shortens delay of switching and authentication.

The method shown in FIG. 1 is applicable when multiple authenticators (one SA and multiple CAs) exist at the time of switching the MN. The following describes how the method works in such scenarios.

Figure 2A:
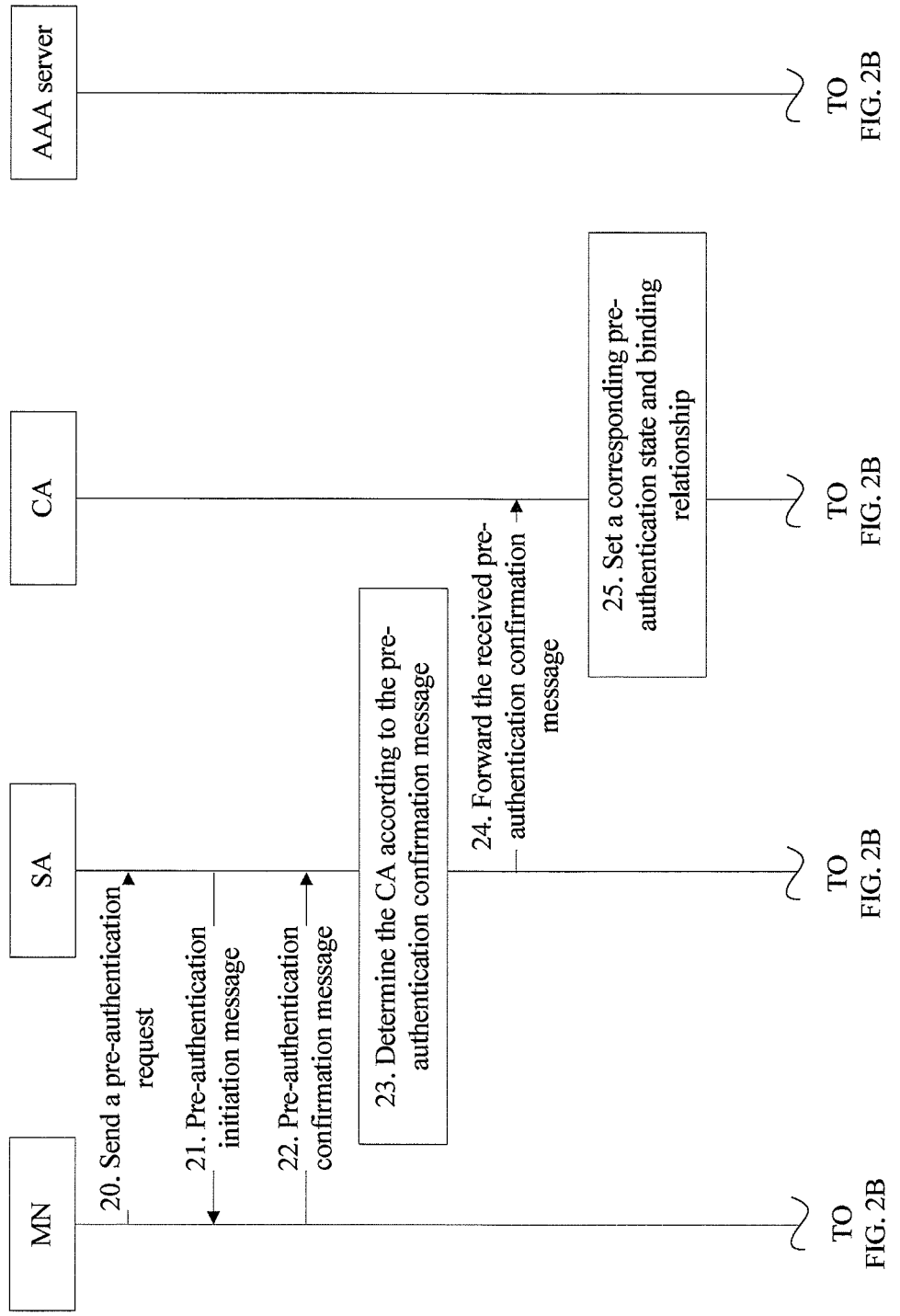
FIG. 2A and FIG. 2B are schematic flowcharts of a pre-authentication method according to another embodiment of the present invention.
Figure 2B:
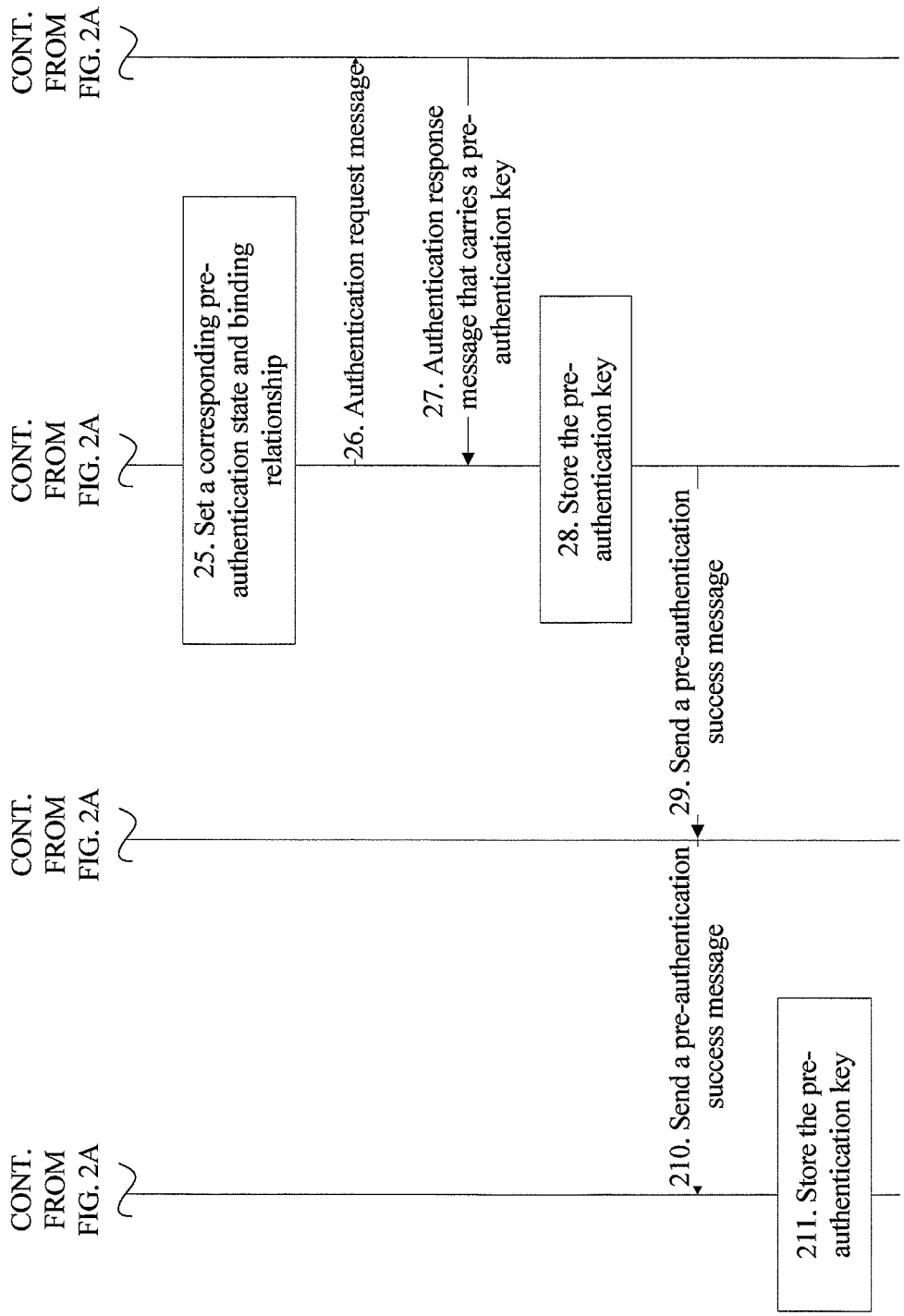

FIG. 2A and FIG. 2B show another embodiment of the pre-authentication method. In this embodiment, an SA or an MN is responsible for discovering a CA. That is, the SA or the MN obtains a CA_ID by using a discovery mechanism before start of pre-authentication. The CA_ID may be an IP address of the CA, a domain name of the CA, or another identifier (ID) that uniquely identifies the CA. In the pre-authentication, the SA undertakes a function of an Authenticator Relay. The method in this embodiment includes the following steps:

20. The MN initiates a pre-authentication request to the SA. The pre-authentication request carries a pre-authentication option, and requests the SA to select the CA for the MN. The pre-authentication option is a Pre-auth Start flag or a CA_ID. It should be noted that this step is optional. When this step occurs, the pre-authentication is initiated by the MN; if this step is omitted, the pre-authentication is initiated by a network.

21. The SA sends a pre-authentication initiation message to the MN, requesting the MN to confirm whether to initiate the pre-authentication. In this step, the SA may send the pre-authentication initiation message to the MN actively, or as requested by the MN. The pre-authentication initiation message carries a pre-authentication option. The pre-authentication option is a Pre-auth Start flag. The pre-authentication initiation message may carry a CA_ID (if the SA discovers the CA), or carries no CA_ID (if the MN discovers the CA).

The pre-authentication initiation message may be an EAP initiation (EAP-Initiate) message or an EAP request (EAP-Req) message that carries the Pre-auth Start flag.

22. The MN sends a pre-authentication confirmation message to the SA according to the pre-authentication initiation message that is sent by the SA, where the pre-authentication confirmation message carries a pre-authentication option. The pre-authentication option may be a pre-authentication indication (Pre-auth Indication) flag, which indicates whether the initiated authentication is pre-authentication or ordinary authentication. The pre-authentication confirmation message carries a CA_ID which indicates the CA to be pre-authenticated. The pre-authentication confirmation message may be an EAP-Initiate message or an EAP-Rsp message that carries the Pre-auth Indication flag.

23. The SA determines the CA according to the CA_ID carried in the pre-authentication confirmation message. The CA_ID is carried in an extended Peer_ID option (Peer_ID@CA_ID) of the EAP-Initiate message or the EAP-Rsp message, or carried in an independent CA_ID option.

24. The SA forwards the pre-authentication confirmation message to the CA which is determined according to the pre-authentication confirmation message. When the SA sends this message, the EAP-Initiate message or the EAP-Rsp message that serves as the pre-authentication confirmation message may be sent over a layer-3 protocol. The SA does not modify content of the pre-authentication confirmation message when forwarding the message.

25. After receiving the pre-authentication confirmation message, the CA locally establishes a pre-authentication binding relationship and pre-authentication state, that is, establishes a binding relationship between the MN and the CA, and marks an authentication state of the MN as pre-authenticated. In this step, the CA may confirm that the message is a pre-authentication confirmation message according to the pre-authentication option, for example, the extended option (Peer_ID@CA_ID) of the Peer_ID or the Pre-auth Indication flag, in the message.

26. The CA sends an authentication request message to an AAA server, requesting the AAA server to authenticate the MN. The authentication request message carries a pre-authentication option and an MN ID. The MN ID may be a Network Access Identifier (NAI) or a home domain name of the MN.

27. After receiving the authentication request message that is sent by the CA, the AAA server authenticates the MN. After the authentication succeeds, the AAA server generates a pre-authentication key used between the CA and the MN, and sends an authentication response message to the CA. The authentication response message carries the generated pre-authentication key used between the CA and the MN.

28. After receiving the authentication response message that is sent by the AAA server, the CA obtains and stores the pre-authentication key carried in the message.

29-210. Through the SA, the CA sends a pre-authentication success message to the MN that sends the pre-authentication confirmation message. The pre-authentication success message carries the pre-authentication key that is sent by the AAA server, and the message may be an EAP-Finish message or an EAP-Success message that carries the pre-authentication key.

211. After receiving the pre-authentication success message that is sent by the SA, the MN obtains and stores the pre-authentication key carried in the message. After obtaining the pre-authentication key, the MN completes the pre-authentication with the AAA server. After being attached to the CA, the MN can use the pre-authentication key to protect communication between the MN and the CA.

In this embodiment, the AAA server may also generate an MSK and an EMSK for authentication between the AAA server and the MN. The MSK and the EMSK may also be sent by the AAA server to the MN through the CA.

In this embodiment, the SA sends a pre-authentication message to the CA according to the selection made by the MN; the CA locally establishes a pre-authentication binding relationship with the MN; after the AAA server successfully authenticates the MN that serves as a client, the pre-authentication key generated by the AAA server is sent to the MN and the CA to complete the pre-authentication between the MN and the AAA server. In this way, when the MN switches to the CA, the MN can use the received pre-authentication key to protect the communication between the MN and the CA, and delay of switching and authentication is shortened.

Figure 3:
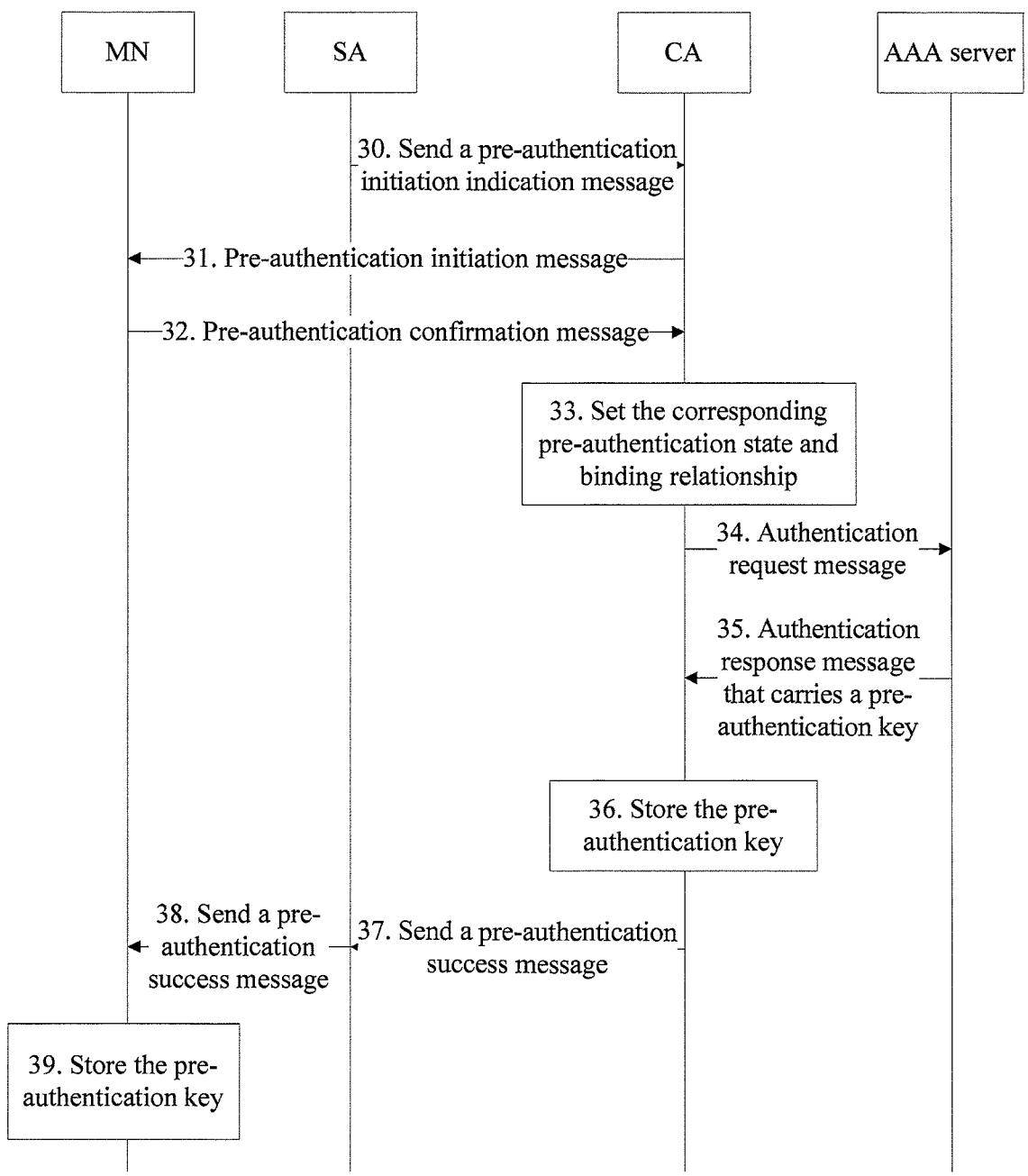
FIG. 3 is a schematic flowchart of a pre-authentication method according to another embodiment of the present invention.

In the pre-authentication method in this embodiment, the pre-authentication may also be initiated by the CA as indicated by the SA. FIG. 3 shows another embodiment of the pre-authentication method. In this embodiment, an SA is responsible for discovering a CA. The method in this embodiment includes the following steps:

30. The SA sends a pre-authentication initiation indication message to the CA, where the pre-authentication initiation indication message carries a pre-authentication option. The pre-authentication option may be a Pre-auth Indication flag, which indicates whether the initiated authentication is pre-authentication or ordinary authentication. The pre-authentication initiation indication message further carries an MN ID. The MN ID may be an address of an MN, a domain name of the MN, or a Peer_ID of the MN.

31. After receiving the pre-authentication initiation indication message, the CA sends a pre-authentication initiation message to the MN according to the MN ID carried in the pre-authentication initiation indication message. The pre-authentication initiation message carries a pre-authentication option, and may be an EAP-Initiate message or an EAP-Req message that carries a Pre-auth Start flag.

32. The MN sends a pre-authentication confirmation message to the CA according to the pre-authentication initiation indication message that is sent by the CA, where the pre-authentication confirmation message carries the pre-authentication option. The pre-authentication confirmation message is specifically an EAP-Initiate message or an EAP-Rsp message that carries a Pre-auth Indication flag.

33. After receiving the pre-authentication confirmation message, the CA locally establishes a corresponding pre-authentication binding relationship and pre-authentication state, that is, establishes a binding relationship between the MN and the CA, and marks an authentication state of the MN as pre-authenticated.

Steps 34-39 in this embodiment are basically the same as steps 26-211 shown in FIG. 2A and FIG. 2B, and are not further described.

In this embodiment, the SA automatically discovers a possible CA, and instructs the CA to initiate pre-authentication to the MN, which avoids delay of switching and authentication caused when the CA is not sure whether the pre-authentication message received from the MN is an ordinary message or a pre-authentication message.

Figure 4:
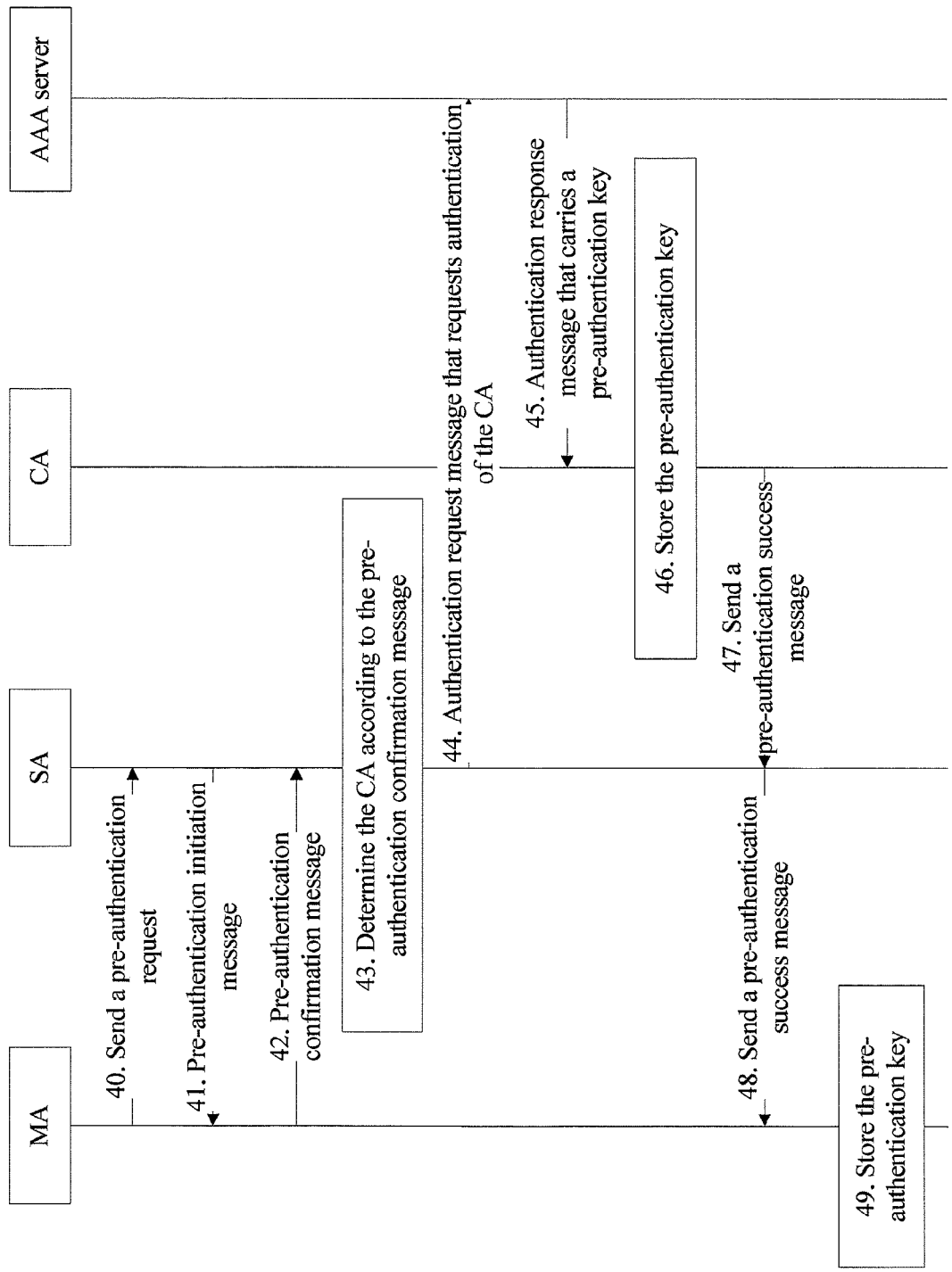
FIG. 4 is a schematic flowchart of a pre-authentication method according to another embodiment of the present invention.

In another embodiment of the present invention, an SA may replace a CA to send a request to an AAA server for initiating a process of pre-authenticating an MN. FIG. 4 is a schematic flowchart of a pre-authentication method according to another embodiment of the present invention. In this embodiment, the SA or the MN is responsible for discovering the CA. That is, the SA or the MN obtains a CA_ID by using a discovery mechanism before start of pre-authentication. The CA_ID may be an IP address of the CA, a domain name of the CA, or another ID that uniquely identifies the CA. The method includes the following steps:

40. The MN initiates a pre-authentication request to the SA. The pre-authentication request may carry a pre-authentication option, and requests the SA to select the CA for the MN. It should be noted that this step is optional. When this step occurs, the pre-authentication is initiated by the MN; if this step is omitted, the pre-authentication is initiated by a network.

41. The SA sends a pre-authentication initiation message to the MN. In this step, the SA may send the pre-authentication initiation message to the MN actively, or as requested by the MN. The pre-authentication initiation message carries a pre-authentication option. Specifically, the pre-authentication initiation message may carry a Pre-auth Start flag, which requests the MN to confirm whether to initiate pre-authentication. The pre-authentication initiation message may carry a CA_ID (if the SA discovers the CA), or carries no CA_ID (if the MN discovers the CA). The pre-authentication initiation message may be an EAP-Initiate message or an EAP-Req message that carries the Pre-auth Start flag.

42. The MN sends a pre-authentication confirmation message to the SA according to the pre-authentication initiation message that is sent by the SA, where the pre-authentication confirmation message carries a pre-authentication option. Specifically, the pre-authentication confirmation message may carry a Pre-auth Indication flag that indicates whether the initiated authentication is pre-authentication or ordinary authentication. The pre-authentication confirmation message carries a CA_ID that indicates the CA selected by the MN. The pre-authentication confirmation message may be an EAP-Initiate message or an EAP-Rsp message that carries the Pre-auth Indication flag.

43. The SA determines the CA according to the received pre-authentication confirmation message.

44. The SA sends an authentication request message to the AAA server. The authentication request message carries an extended Peer_ID option (which carries a Peer_ID and the CA_ID) and other pre-authentication options, and requests the AAA server to pre-authenticate the MN.

45. After receiving the authentication request message that is sent by the SA, the AAA server authenticates the MN that serves as a client, and extracts the CA_ID. After successfully authenticating the MN, the AAA server generates a pre-authentication key between the CA and the MN, and sends an authentication response message to the CA. The authentication response message carries the generated pre-authentication key.

Steps 46-49 in this embodiment are basically the same as steps 28-211 shown in FIG. 2A and FIG. 2B, and are not further described.

In this embodiment, after receiving the pre-authentication confirmation message that is sent by the MN, the SA replaces the CA to send a request to the AAA server for pre-authenticating the MN, and the AAA server distributes the pre-authentication key to the MN and the CA. When the MN switches to the CA, the pre-authentication key distributed by the AAA server may be used to perform quick authentication, which shortens the delay of switching and authentication.

Figure 5:
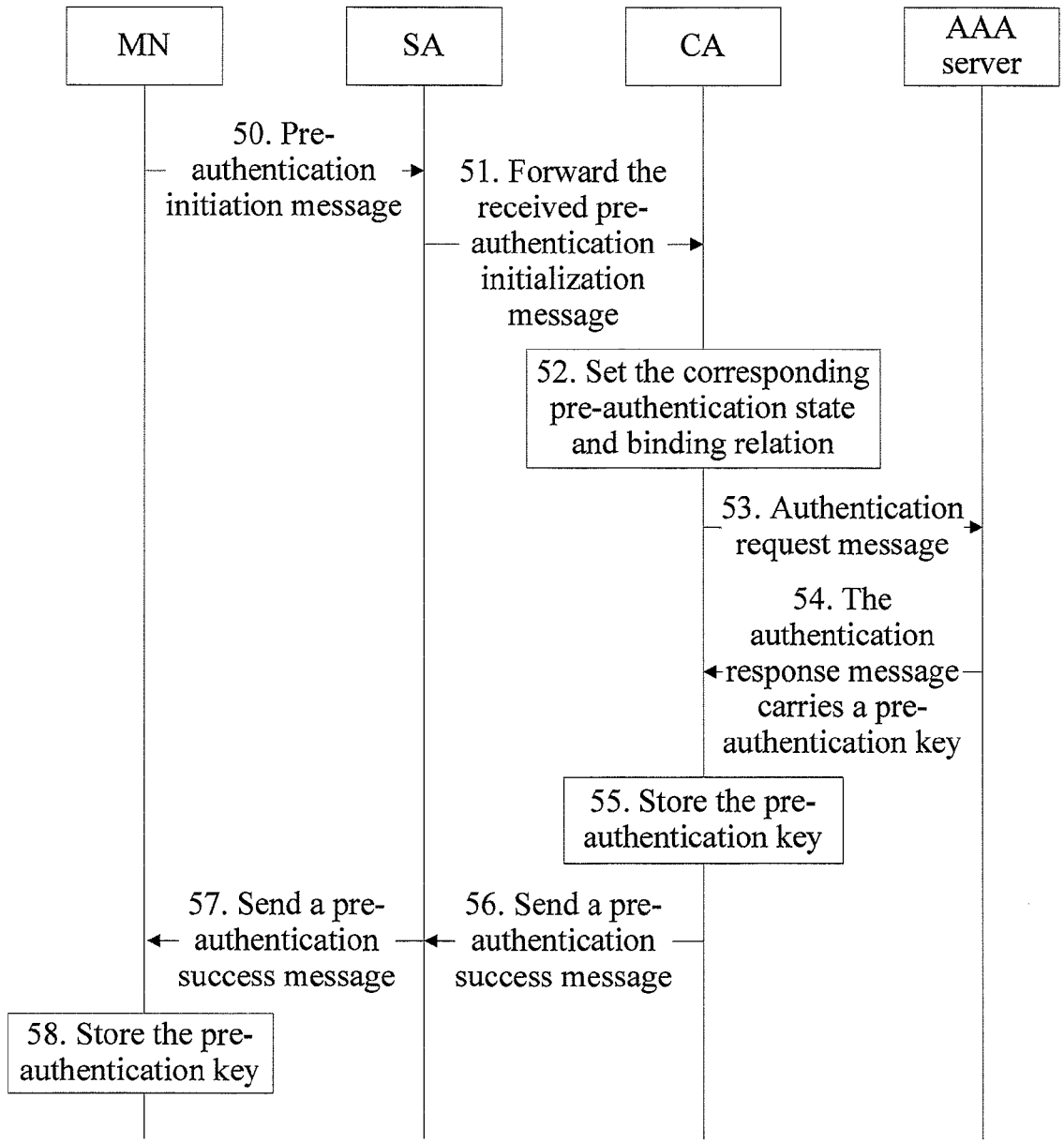
FIG. 5 is a schematic flowchart of a pre-authentication method according to another embodiment of the present invention.

In this embodiment, the MN may be responsible for discovering the CA, that is, obtaining the CA_ID, and the MN initiates a pre-authentication process after discovering the CA. FIG. 5 is a schematic flowchart of the MN actively initiating a pre-authentication process according to an embodiment of the present invention. The process includes the following steps:

50. An MN sends a pre-authentication initiation message to an SA, where the pre-authentication initiation message carries a pre-authentication option. Specifically, the pre-authentication initiation message may be an EAP-Initiate message or an EAP-Req message that carries a CA_ID or a layer-2 link ID (BS_ID) corresponding to a CA. The CA_ID or the BS_ID may be an independent option of the pre-authentication initiation message, or is an extended option (in the form of Peer_ID@CA_ID or Peer_ID@BS_ID) of a Peer_ID.

51. After receiving the pre-authentication initiation message, the SA confirms that the message is a pre-authentication initiation message according to the CA_ID or the BS_ID carried in the message, and obtains the CA directly or by querying a mapping relationship between the layer-2 link ID and a layer-3 link ID (if the message carries the BS_ID). Without changing the message, the SA sends the message to the CA over a layer-3 protocol.

52. The CA determines that the pre-authentication initiation message is a pre-authentication request according to the pre-authentication option in the received pre-authentication initiation message, and locally establishes a corresponding pre-authentication binding relationship and pre-authentication state, that is, establishes a binding relationship between the MN and the CA, and marks an authentication state of the MN as pre-authenticated.

Steps 53-58 in this embodiment are the same as the steps 26-211 shown in FIG. 2A and FIG. 2B, and are not further described.

In this embodiment, the MN actively initiates pre-authentication after discovering the CA or the BS_ID. In this way, a pre-authentication key between the CA and the MN is distributed, and the delay of switching and authentication is shortened.

An embodiment of the present invention provides a pre-authentication device. The pre-authentication device may act as an SA or a CA described in the preceding method embodiments.

Figure 6:
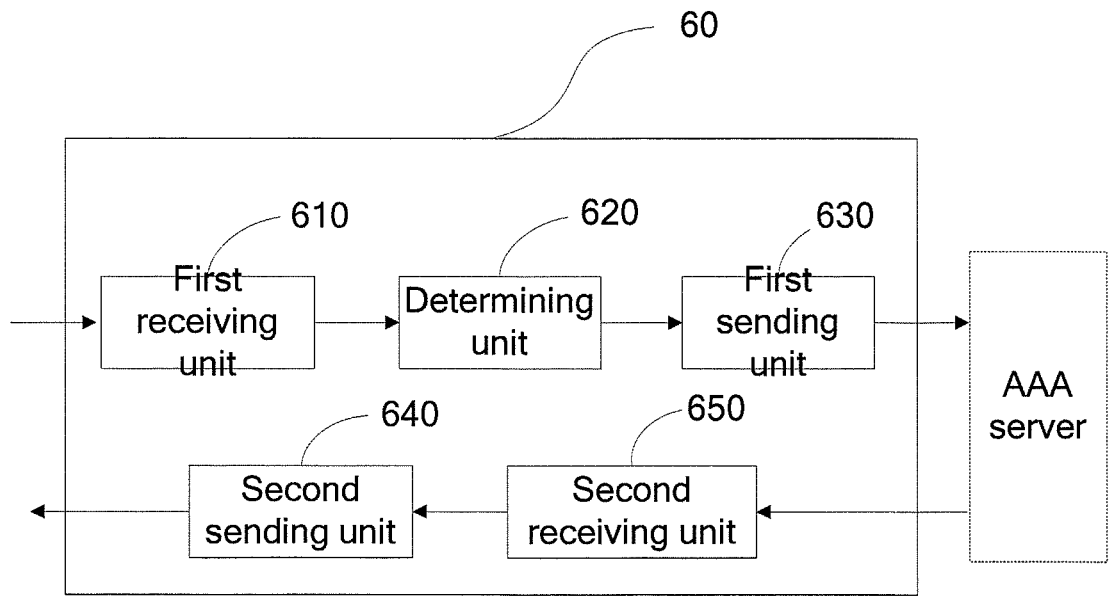
FIG. 6 is a schematic structural diagram of a pre-authentication device according to an embodiment of the present invention.

FIG. 6 is a schematic structural diagram of a pre-authentication device according to an embodiment of the present invention. A pre-authentication device 60 is configured to initiate pre-authentication of an MN. A first receiving unit 610 is configured to send a pre-authentication message to a determining unit 620 after receiving the pre-authentication message that carries a pre-authentication option. The determining unit 620 determines an MN to be pre-authenticated according to a source node of the pre-authentication message or the pre-authentication option carried in the pre-authentication message. Afterward, a first sending unit 630 sends an authentication request message to an AAA server, requesting the AAA server to pre-authenticate the MN. The authentication request message carries a pre-authentication option and an ID of the MN to be pre-authenticated, and also needs to carry a CA_ID. The CA_ID may be carried in the pre-authentication option or another option. After successfully authenticating the MN, the AAA server generates a pre-authentication key used between the MN and the CA according to the pre-authentication option, and sends the pre-authentication key to a second receiving unit 650 through an authentication response message. After receiving the pre-authentication key that is sent by the AAA server, the second receiving unit 650 sends the pre-authentication key to a second sending unit 640, and the second sending unit 640 sends the pre-authentication key to the MN. In this way, the pre-authentication key is distributed.

In the embodiment shown in FIG. 6, two or more units may be set separately, or integrated in one module. For example, the first receiving unit 610 and the second receiving unit 650 may be integrated in a receiving module; the first sending unit 630 and the second sending unit 640 may be integrated in a sending module; the first receiving unit 610, the second receiving unit 650, the first sending unit 630, and the second sending unit 640 may be integrated in a receiving and sending module.

Figure 7:
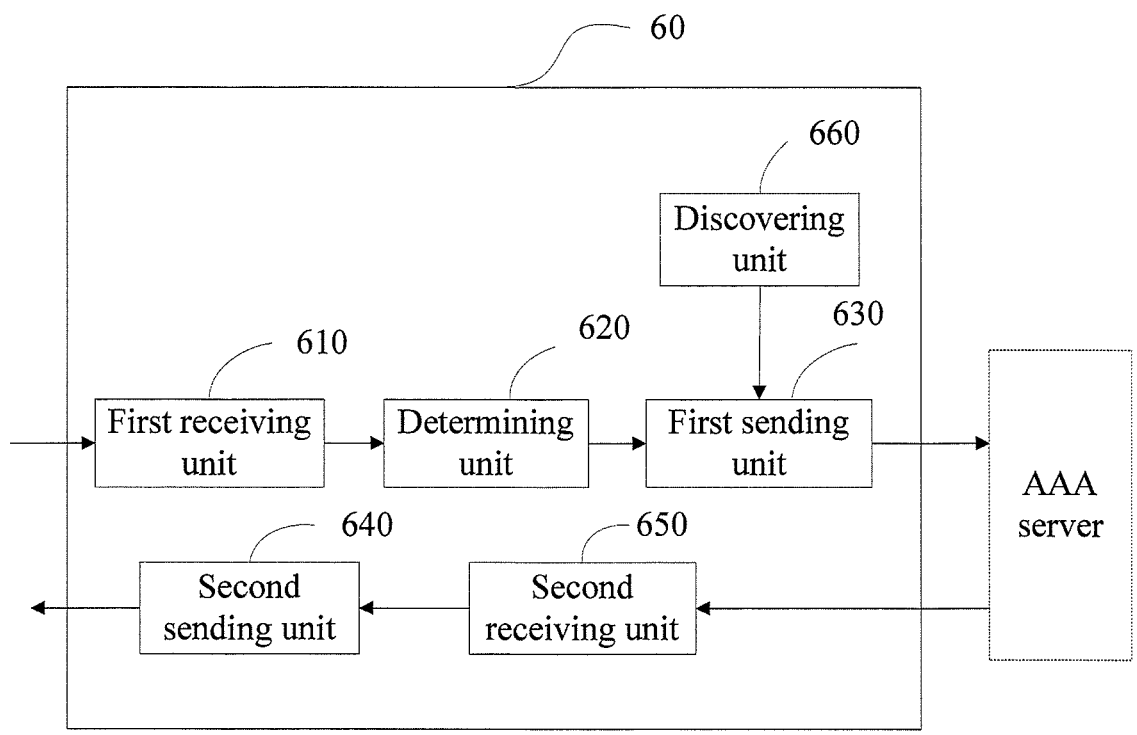
FIG. 7 is a schematic structural diagram of a pre-authentication device according to another embodiment of the present invention.

In the case that the pre-authentication device 60 acts as an SA, the structure of the pre-authentication device provided in another embodiment of the present invention is shown in FIG. 7. This pre-authentication device 60 includes at least a discovering unit 660 in addition to the units shown in FIG. 6. The discovering unit 660 is configured to discover the CA of the MN. The first sending unit 630 is further configured to send a pre-authentication initiation message to the MN, where the pre-authentication initiation message carries an ID of the discovered CA. The pre-authentication initiation message may be an EAP-Initiate message or an EAP-Req message that carries a Pre-auth Start flag. In this case, the pre-authentication message received by the first receiving unit 610 is a pre-authentication confirmation message that is sent by the MN and carries the ID of the selected CA, and is specifically an EAP-Initiate message or an EAP-Rsp message that carries a Pre-auth Indication flag.

Figure 8:
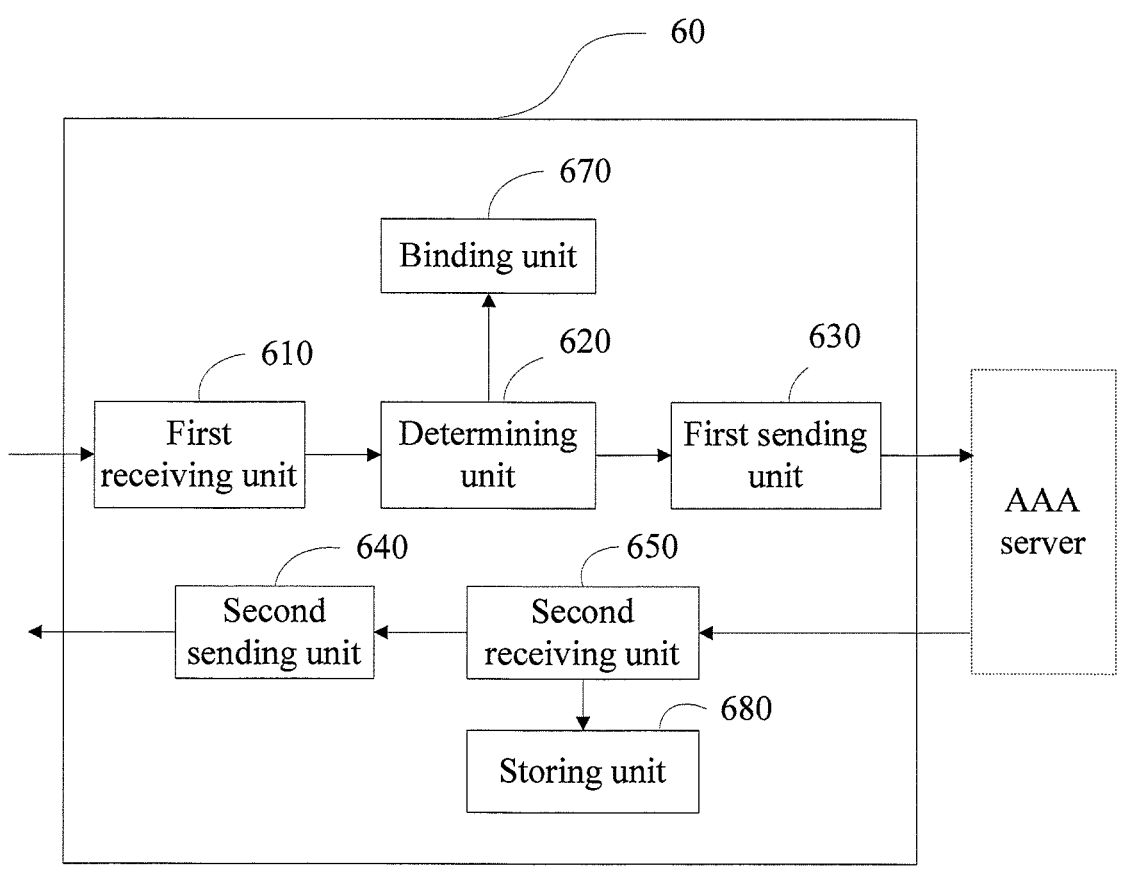
FIG. 8 is a schematic structural diagram of a pre-authentication device according to another embodiment of the present invention.

In the case that the pre-authentication device 60 acts as a CA described in the preceding method embodiments, the structure of the pre-authentication device provided in another embodiment of the present invention is shown in FIG. 8. The pre-authentication device 60 includes at least a binding unit 670 and a storing unit 680 in addition to the units shown in FIG. 6. After the determining unit 620 determines the MN to be pre-authenticated according to the pre-authentication message, the binding unit 670 locally establishes a binding relationship between the CA and the MN, and sets the authentication state of the MN as pre-authenticated. After receiving the authentication response message that is sent by the AAA server, the second receiving unit 650 obtains the pre-authentication key from the message, and sends the pre-authentication key to the storing unit 680. The storing unit 680 is configured to store the pre-authentication key. In this way, when the MN switches to the CA, the stored pre-authentication key may be used to quickly authenticate the MN, which shortens delay of switching and authentication.

When the pre-authentication device 60 is a CA, the pre-authentication message may be:

an EAP-Initiate message or an EAP-Rsp message that is sent by the SA and carries a Pre-auth Indication flag or a CA_ID; or an EAP-Initiate message or an EAP-Rsp message that is sent by the MN and carries a Pre-auth Indication flag or a CA_ID; or an EAP-Initiate message or an EAP-Req message that is sent by the SA and carries a CA_ID or a BS_ID corresponding to the CA.

In this embodiment, after receiving a pre-authentication message, the pre-authentication device requests the AAA server to authenticate the MN according to the pre-authentication option and the MN associated information in the pre-authentication message, and receives a pre-authentication key between the MN and the CA from the AAA server. In this way, when the MN switches to the CA, the pre-authentication key may be used to protect the communication between the MN and the CA, and delay of switching and authentication is shortened.

An embodiment of the present invention discloses a pre-authentication system. The pre-authentication system 90 includes a pre-authentication device 910 and an AAA server 920. When the pre-authentication system runs, the pre-authentication device 910 receives a pre-authentication message from an SA or an MN, where the pre-authentication message carries a pre-authentication option. The pre-authentication device 910 determines the MN to be pre-authenticated according to the pre-authentication message. If the pre-authentication message is received from an MN, the MN to be pre-authenticated is the MN that sends the pre-authentication message; if the pre-authentication message is obtained from the SA, the pre-authentication message needs to carry information about the MN to be pre-authenticated, and the MN to be pre-authenticated is determined according to the information carried in the pre-authentication message. The pre-authentication option carried in the pre-authentication message includes a Pre-auth Indication flag or a CA_ID. The pre-authentication device 910 sends an authentication request message to the AAA server 920 according to the pre-authentication message, requesting authentication of the MN to be pre-authenticated. The authentication request message carries a pre-authentication option that is the same as the pre-authentication option carried in the pre-authentication message, and the pre-authentication option indicates that the authentication of the MN is pre-authentication.

Figure 9:
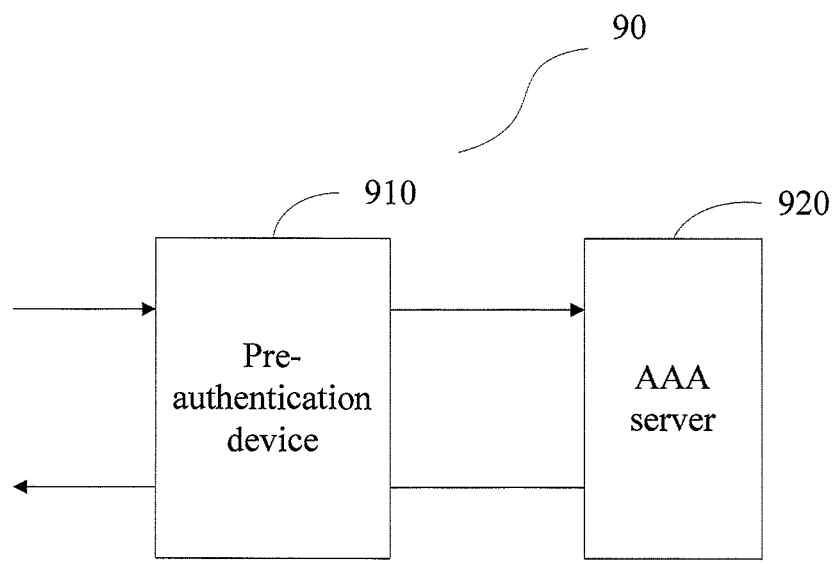
FIG. 9 is a schematic structural diagram of a pre-authentication system according to an embodiment of the present invention.

After receiving the authentication request message, the AAA server 920 authenticates the MN according to the authentication request message. After the authentication succeeds, the AAA server generates a pre-authentication key between a CA and the MN according to the pre-authentication option in the authentication request message, adds the pre-authentication key to an authentication response message, and sends the authentication response message to the pre-authentication device 910. The pre-authentication device 910 sends the pre-authentication key to the MN (not shown in FIG. 9).

The pre-authentication device 910 may be the SA or the CA of the MN. When the pre-authentication device 910 is the SA, the pre-authentication device can discover the CA of the MN, and initiate a pre-authentication process as requested by the MN or according to a policy. The pre-authentication device 910 obtains the pre-authentication key between the CA and the MN from the AAA server through the CA of the MN. When the pre-authentication device 910 is the CA, the pre-authentication device can establish a pre-authentication binding relationship between the MN and the pre-authentication device, and set an authentication state of the MN as pre-authenticated according to the received pre-authentication request. Moreover, the pre-authentication device can store the pre-authentication key and send the pre-authentication key to the MN through the SA after receiving the pre-authentication key that is sent by the AAA server.

Through implementation of the present invention, the SA or the CA can correctly identify a pre-authentication message; after receiving the pre-authentication message, the SA or the CA obtains the pre-authentication key used between the CA and the MN from the AAA server; when the MN switches to the CA, the pre-authentication key may be used to protect communication between the MN and the CA. In this way, security of communication is enhanced, and delay of switching and authentication is shortened.

Persons of ordinary skill in the art should understand that all or part of the steps of the methods provided in the preceding embodiments may be implemented by a computer program instructing relevant hardware. The program may be stored in computer readable storage media. When being executed, the program may perform steps of a method specified in any preceding embodiment. The storage media may be a magnetic disk, a Compact Disk-Read Only Memory (CD-ROM), a Read Only Memory (ROM), or a Random Access Memory (RAM).

The preceding descriptions are merely exemplary embodiments of the present invention, and not intended to limit the protection scope of the present invention. Any modification, variation, or replacement that can be easily derived by those skilled in the art shall fall within the protection scope of the present invention. Therefore, the protection scope of the present invention is subject to the appended claims.

What is claimed is:

1. A pre-authentication method, comprising:
receiving a pre-authentication message that carries a pre-authentication option;
determining, according to the pre-authentication message, a Mobile Node (MN) to be pre-authenticated;
establishing a pre-authentication binding relationship between a Candidate Authenticator (CA) and the MN, and setting an authentication state of the MN as pre-authenticated according to the pre-authentication message;
sending an authentication request message to an Authentication, Authorization and Accounting (AAA) server to request authentication of the MN, wherein the authentication request message carries the pre-authentication option;
receiving an authentication response message that is sent by the AAA server, wherein the authentication response message carries a pre-authentication key used between the CA and the MN; and
sending the pre-authentication key to the MN;
wherein:
the pre-authentication message is an Extensible Authentication Protocol (EAP) initiation (EAP-Initiate) message or an EAP response (EAP-Rsp) message that is sent by a Serving Authenticator (SA) and carries a pre-authentication indication (Pre-auth Indication) flag or a CA identifier (CA_ID).

2. The method according to claim 1, wherein:
before the receiving the pre-authentication message, the method further comprises:
sending, by the SA, an EAP-Initiate message that carries a Pre-auth Start flag to the MN, and receiving the EAP-Initiate message that is sent by the MN and carries the Pre-auth Indication flag or a CA_ID; or
sending, by the SA, an EAP request (EAP-Req) message that carries the Pre-auth Start flag to the MN, and receiving the EAP-Rsp message that is sent by the MN and carries the Pre-auth Indication flag or the CA_ID.

3. A pre-authentication method, comprising:
receiving a pre-authentication message that carries a pre-authentication option;
determining, according to the pre-authentication message, a Mobile Node (MN) to be pre-authenticated;
establishing a pre-authentication binding relationship between a Candidate Authenticator (CA) and the MN, and setting an authentication state of the MN as pre-authenticated according to the pre-authentication message;
sending an authentication request message to an Authentication, Authorization and Accounting (AAA) server to request authentication of the MN, wherein the authentication request message carries the pre-authentication option;
receiving an authentication response message that is sent by the AAA server, wherein the authentication response message carries a pre-authentication key used between the CA and the MN; and
sending the pre-authentication key to the MN;
wherein:
the pre-authentication message is an Extensible Authentication Protocol (EAP) initiation (EAR-Initiate) message or an EAP response (EAP-Rsp) message that is sent by the MN and carries a Pre-auth Indication flag or a CA identifier (CA_ID).

4. The method according to claim 3, wherein:
before the receiving the pre-authentication message, the method further comprises:
receiving a pre-authentication initiation indication message that is sent by a Serving Authenticator (SA) and carries an MN identifier (ID);
sending an EAP-Initiate message or an EAP request (EAP-Req) message that carries a Pre-auth Start flag to the MN according to the pre-authentication initiation indication message; and
receiving the EAP-Initiate message or the EAP-Rsp message that is sent by the MN and carries the Pre-auth Indication flag or the CA_ID.

5. A pre-authentication device, comprising:
a first receiving unit, configured to receive a pre-authentication message that carries a pre-authentication option;
a determining unit, configured to determine a Mobile Node (MN) to be pre-authenticated according to the pre-authentication message;
a first sending unit, configured to send an authentication request message to an Authentication, Authorization and Accounting (AAA) server to request authentication of the MN, wherein the authentication request message carries the pre-authentication option;
a second receiving unit, configured to receive an authentication response message that is sent by the AAA server, wherein the authentication response message carries a pre-authentication key used between a Candidate Authenticator (CA) and the MN;
a second sending unit, configured to send the pre-authentication key to the MN;
a storing unit, configured to store the pre-authorization key carried in the authentication response message received by the second receiving unit from the AAA server; and
a binding unit, configured to establish a pre-authentication binding relationship between the CA and the MN after the determining unit determines the MN to be pre-authenticated, and set an authentication state of the MN as pre-authenticated according to the pre-authentication message.

6. The pre-authentication device according to claim 5, further comprising:
a discovering unit, configured to discover the CA of the MN; wherein
the first sending unit is further configured to send a pre-authentication initiation message to the MN so that the MN selects the CA.

7. A pre-authentication system, comprising:
a pre-authentication device, configured to: receive a pre-authentication message that carries a pre-authentication option, determine a Mobile Node (MN) to be pre-authenticated according to the pre-authentication message, send an authentication request message to an Authentication, Authorization and Accounting (AAA) server to request authentication of the MN, wherein the authentication request message carries the pre-authentication option, receive an authentication response message that is sent by the AAA server, wherein the authentication response message carries a pre-authentication key used between a Candidate Authenticator (CA) and the MN, and send the pre-authentication key to the MN; and the AAA server, configured to: receive the authentication request message that is sent by the pre-authentication device, generate the pre-authentication key used between the CA and the MN according to the authentication request message, add the pre-authentication key to the authentication response message, and send the authentication response message to the pre-authentication device;

wherein:

the pre-authentication device is the CA of the MN, and the pre-authentication device is further configured to store the pre-authentication key between the CA and the MN, where the pre-authentication key is carried in the authentication response message received from the AAA server.

8. The pre-authentication system according to claim 7, wherein:

the pre-authentication device is further configured to locally establish a pre-authentication binding relationship between the pre-authentication device and the MN, and set an authentication state of the MN as pre-authenticated after determining the MN to be pre-authenticated.

* * * * *